United States Patent [19]

Scholtz

[11] 4,095,572
[45] Jun. 20, 1978

[54] FUEL SYSTEM FOR COMPRESSION IGNITION ENGINE

[75] Inventor: Robert L. Scholtz, Columbus, Ind.
[73] Assignee: Cummins Engine Company, Inc., Columbus, Ind.
[21] Appl. No.: 715,604
[22] Filed: Aug. 18, 1976
[51] Int. Cl.² ............................................. F02M 5/10
[52] U.S. Cl. ........................................... 123/140 MP
[58] Field of Search .... 123/140 MP, 140 A, 140 FG, 123/139 AW, 139 AA, 139 AF, 139 AV

[56] References Cited
U.S. PATENT DOCUMENTS

| 2,426,153 | 8/1947 | Mock | 123/139 AW |
| 2,749,898 | 6/1956 | Isley | 123/140 MP |
| 2,884,918 | 5/1959 | Klug | 123/140 MP X |
| 3,187,732 | 6/1965 | Orner | 123/139 AW |
| 3,771,507 | 11/1973 | Silvester | 123/140 MP X |
| 3,789,819 | 2/1974 | Moulds | 123/140 MP |

Primary Examiner—Charles J. Myhre
Assistant Examiner—Tony M. Argenbright
Attorney, Agent, or Firm—Gary M. Gron; Robert T. Ruff

[57] ABSTRACT

A turbocharged diesel engine fuel system has its output fuel pressure varied upon acceleration as a direct function of the engine's manifold air pressure. The improvement of an orifice and chamber of predetermined size produces a delay in the transmission of the manifold air pressure signal to the fuel system. This, in turn, causes a delay in the increase of fuel rate to the engine thereby minimizing acceleration smoke without hurting engine power during steady state operation.

5 Claims, 3 Drawing Figures

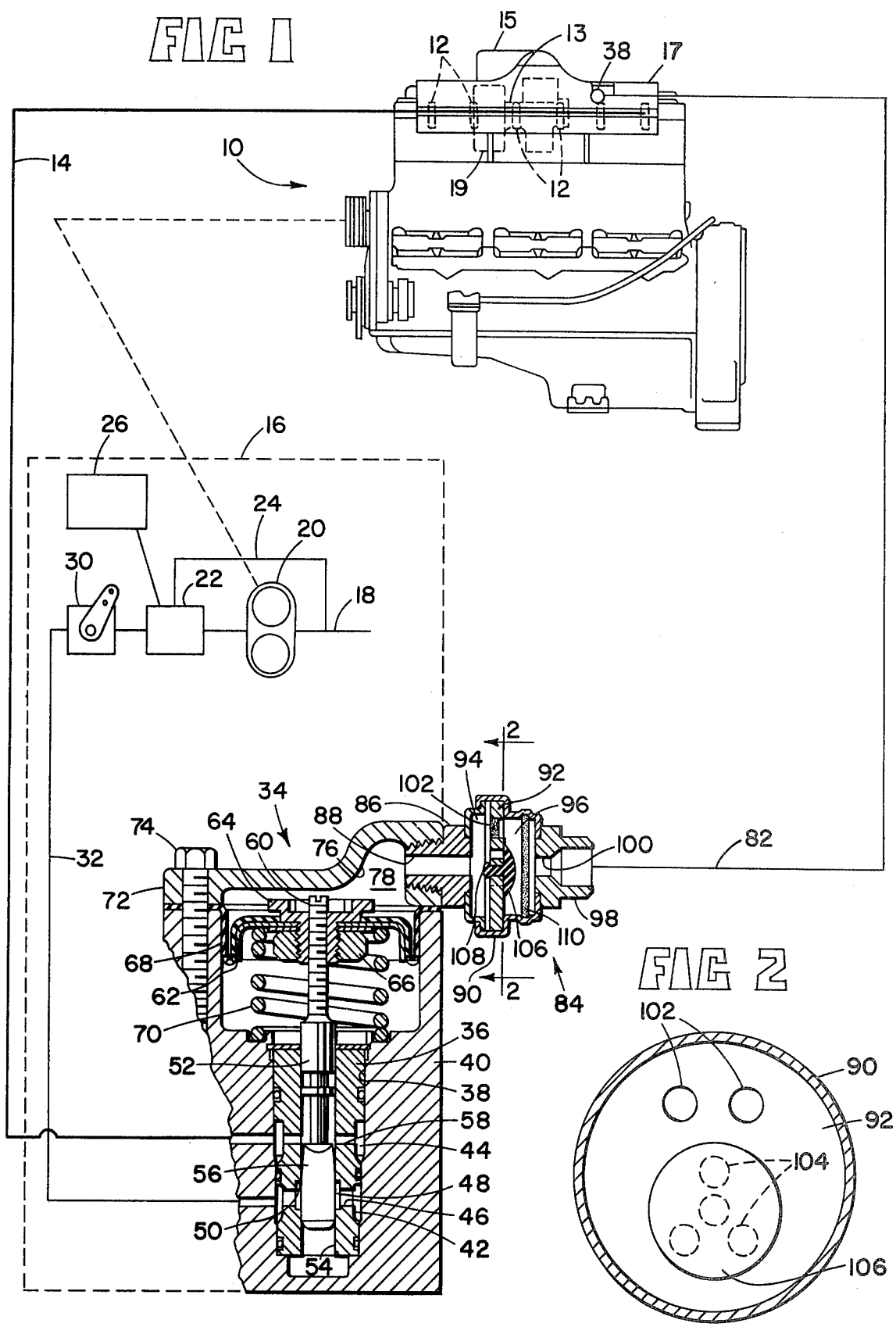

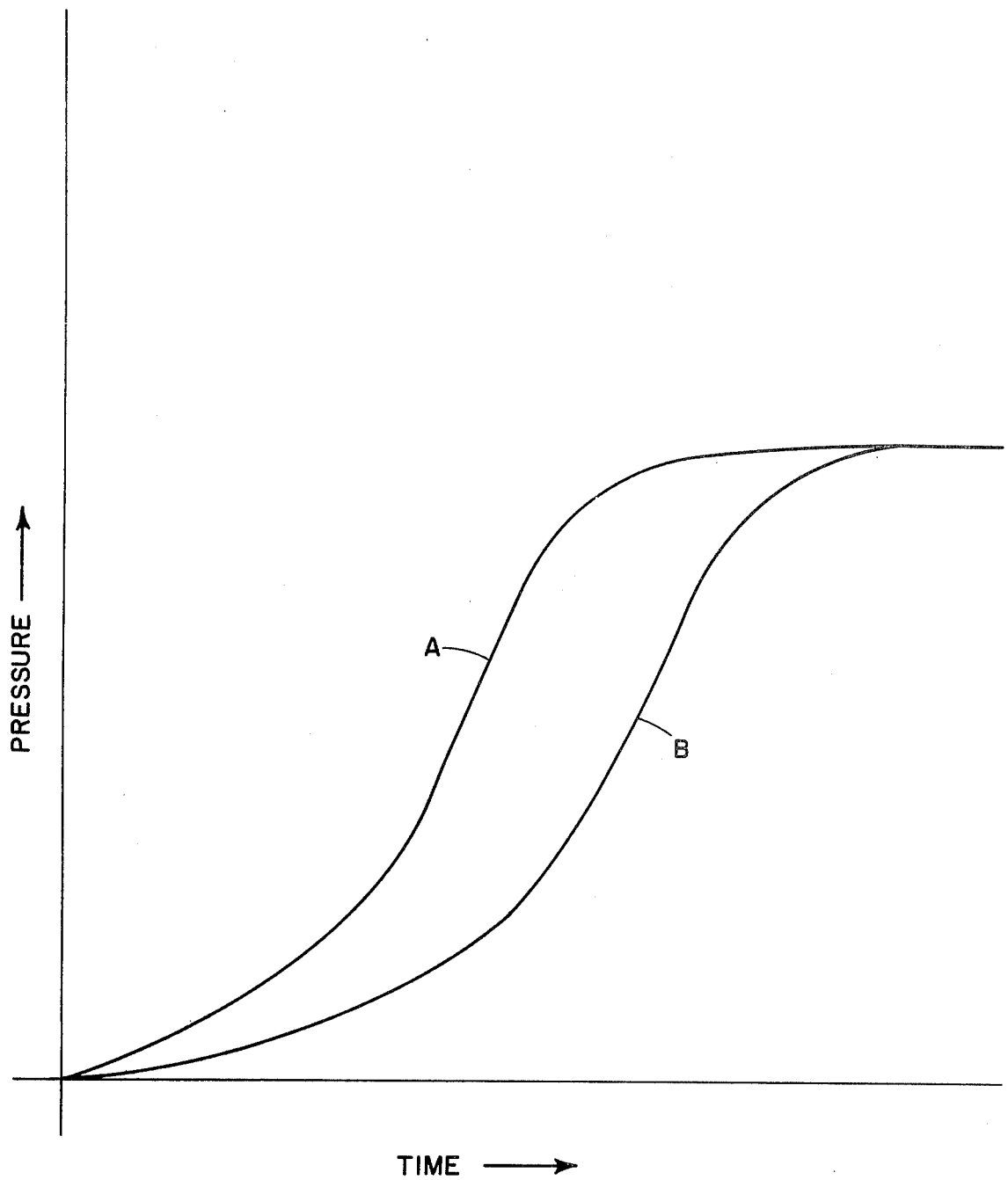

FUEL SYSTEM FOR COMPRESSION IGNITION ENGINE

The present invention relates to fuel systems and more particularly to fuel systems for diesel engines.

The recent trend toward stricter control of diesel engine emissions includes a limitation on the maximum amount of smoke emitted by an engine during acceleration. The smoke problem is manifested particularly in diesel engines which use a turbocharger to pressurize and increase the density of the air delivered to the engine. For such an engine fuel is delivered at a rate which increases as a direct function of engine rpm. During wide open throttle operation the engine can accelerate to its maximum rpm in a very short period of time and so does the fuel rate. At the same time, however, the turbocharger, which lags the acceleration of the engine by a substantial amount, does not deliver a sufficient level of pressure during acceleration to maintain a proper air fuel mixture. This phenomenon is known as "over fueling" and its obvious result is the generation of smoke.

In an attempt to eliminate acceleration smoke, turbocharged engines now use a device responsive to engine manifold pressure to vary fuel flow to the engine as a direct function of manifold pressure as exemplified in U.S. Pat. No. 3,077,873. In other words, engine fuel is cut back from the maximum rates whenever manifold pressure is below its maximum. The amount of variation is selected so that proper air fuel mixtures are maintained during the acceleration period.

The above devices are quite effective in minimizing acceleration smoke. They introduce, however, another problem with respect to engine performance under certain circumstances. If the degree of modulation is severe enough to meet very low smoke levels, engine performance may be affected. The modulating device cuts back the mixture to a leaner air fuel ratio for avoiding acceleration smoke but this limits power because the mixture is not rich enough to produce maximum power over a broad range of engine rpm. This is particularly true for engine clutch engagement when the engine rpm and manifold pressure are low.

The above problems are solved by a device which produces a delay in transient increases in pressure signals transmitted to a device which has the effect of varying flow of fuel to an engine as a direct function of the manifold pressure level.

The above and other related features of the present invention will be apparent from a reading of the following description of the disclosure shown in the accompanying drawings and the novelty thereof pointed out in the appended claims.

In the drawings:

FIG. 1 is a schematic drawing of a diesel engine and a fuel system embodying the present invention.

FIG. 2 is a cross sectional view of the fuel system of FIG. 1 taken on line 2—2 of FIG. 1.

FIG. 3 is a graph of the pressure vs. time characteristics of the control system of FIG. 1.

FIG. 1 shows a compression ignition engine 10 with which the present invention may be used. Since its principles of operation are well known, the complete details of engine 10 will not be covered to simplify the discussion of the present invention. For the present discussion it is enough to say engine 10 relies on the heat of compression of air to ignite fuel that is injected in timed sequence by fuel injectors 12. Injectors 12 are of the direct injection type in which a cam actuated plunger injects fuel at high pressure into the engine cylinders (not shown) for combustion.

The exhaust gases from the engine pass across the turbine of a turbocharger 13 which drives its compressor 19 to pressurize air for delivery through duct 15 to intake manifold 17. Injectors 12 receive fuel from a fuel system 16 via a distribution conduit 14. Fuel system 16 receives fuel from a supply line 18 and pressurizes it for delivery to conduit 14. The fuel pressure to injectors 12 is controlled in accordance with the pressure-time relationships set forth in U.S. Pat. Nos. 2,727,503 and 2,749,897 to achieve a proper quantity of injected fuel to meet engine operating requirements.

The engine fuel system 16 includes a gear type engine driven pump 20 (note the mechanical connection) having its low pressure side connected to the supply line 18 and feeding a governor controlled bypass valve 22. Valve 22 bypasses fuel from the high pressure side of pump 20 to the fuel supply line 18 through a passage 24. Operation of valve 22 is controlled by a mechanical governor 26 responsive to engine rpm to produce an output fuel flow having a given schedule of pressure vs. engine rpm. From that point, fuel passes to an operator controlled throttle valve 30 which regulates flow in response to operator demand. Fuel from throttle valve 30 passes through a passage 32 to a pressure modulating device 34.

Pressure modulating device 34 comprises a valve sleeve 36 received in a bore 38 in the fuel system housing 40. Valve sleeve 36 has an outer annular groove 42 connecting with passage 32 and another outer groove 44 connecting with supply line 14. Radial ports 46 connect groove 42 with annular groove 48 having a metering edge 50. A valve shaft 52 is slidable in a central bore 54 in sleeve 36. A contoured land 56 on shaft 52 cooperates with metering edge 50 to form a flow area from groove 48 to a series of ports 58 leading to groove 44. The area is a direct function of the linear displacement of shaft 52 in a downward direction as viewed in FIG. 1.

The upper end of shaft 52 is threaded at 60 and secured to a diaphragm support cover 62 by nuts 64 and 66. These elements also secure a flexible diaphragm 68 of suitable elastomeric material. A spring 70 acting on support 62 urges shaft 52 towards the position which tends to block flow to supply line 14. The diaphragm 68 is held in place by a diaphragm cover 72 secured to housing 40 by suitable screws 74. Cover 72 has a cavity 76 which defines a chamber 78. Chamber 78 is connected to the engine intake manifold 17 by a conduit 82 and a delay device generally indicated at 84.

Referring to FIGS. 1 and 2, delay device 84 comprises a fitting 86 threaded into cover 72 so that passage 88 through fitting 86 connects with chamber 78. An annular housing 90 is connected to fitting 86 and has a wall 92 dividing housing 90 into chamber 94 and chamber 96. Chamber 96 is connected to conduit 82 by a fitting 98 and a signal passage 100. Wall 92 has orifices 102 having predetermined cross sectional flow areas. These orifices 102 preferably comprise sintered metal plugs having a predetermined porosity. The net effect of using porous plugs is to have the same flow area of relatively small through passages but having a greater surface area over which air passes through. This acts to render the orifices relatively insensitive to dirt. An example of such a porous plug orifice may be found in U.S. Pat. No. 3,606,871. An additional set of holes 104 are formed in wall 92. Passage through holes 104 is prevented in one direction by a flexible disc 106 secured by a knob 108 extending through wall 92. Flow from chamber 96 to 94 through ports 104 is prevented because of flexible disc 106. However, flow in the opposite direction causes the disc 106 to lift from the surface of wall 92 and permit passage of air through ports 104. A suitable filter disc 110 minimizes the entry of contaminants from the engine manifold.

The delay device 84 consists of one or more restricting orifices (plugs 102) having a predetermined total cross sectional flow area and a chamber of predetermined volume positioned between the orifices 102 and the pressure modulating device 34. This chamber is made up of:

1. Chamber 78 defined by cavity 76.
2. Passage 88 in fitting 86.
3. Chamber 94 in housing 90.

The predetermined chamber and orifices act to delay the transmission of the pressure signal from the engine manifold 80 to the pressure modulating device 34 as described below.

The fuel system 16 functions to control pressure to the injectors at a level which increases generally as a function of operator demand and engine rpm. The pressure in manifold 17 generally increases as a function of engine power. The pressure level of fuel delivered to conduit 14 is additionally varied by device 34 which throttles the fuel flow as a function of air pressure on bellows 68. The air pressure on bellows 68 displaces shaft 52 downward and increases the flow area past metering edge 50 as a direct function of pressure. Therefore, the flow area increases as manifold air pressure increases as reflected by the air pressure in chamber 78. Stated another way the flow rate of fuel delivered to fuel line 14 varies as a direct function of the air pressure in manifold 80.

The delay device 84 produces a predetermined delay in the delivery of the air signal to chamber 78 as follows, with specific reference to FIG. 3. FIG. 3 is a graph of pressure vs. time with Curve A representing the variation in manifold air pressure upon wide open throttle acceleration of the engine from a low rpm to maximum. Curve B represents the variation in pressure experienced by diaphragm 68. This delay occurs because the orifices 102 first restrict flow of the increased air pressure signal from conduit 82 to chamber 78 and because the air takes a given period of time to fill up the predetermined chamber defined above. In effect the orifice and the chamber act as a pneumatic capacitor which delays the build up of pressure. This delay is selected to produce a delay $\Delta t$ sufficient to permit the turbocharger to accelerate sufficiently to lean out the mixture and produce the proper air fuel ratio that avoids smoke without the fuel system quickly adding more fuel to make the ratio richer. When manifold pressure rapidly decreases the disc 106 permits free flow of air out of chamber 78 and therefore rapid lowering of pressure. This insures that the mixture will not be overly rich when the throttle is reopened quickly such as after a gear shift.

Because of the above device the degree of pressure modulation of device 34 can be reduced thereby permitting a richer air fuel ratio and therefore greater power output during steady state and relatively low transient acceleration. This minimizes acceleration smoke without sacrificing performance.

While the preferred embodiment of the present invention has been described, other modifications will be apparent to those skilled in the art.

Having thus described the invention what is claimed as novel and desired to be secured by letters patent of the United States is:

1. Apparatus comprising:
   an air breathing internal combustion engine having an intake manifold and a compressor for delivering air to said intake manifold at a pressure level generally increasing as a direct function of increasing engine power level;
   means for delivering fuel to said engine at a pressure level which increases as a direct function of increasing engine rpm and increasing operator demand;
   pressure modulating means connected between said fuel delivery means and said engine having a cavity responsive to a pressure signal for varying the pressure level of fuel from said fuel delivery means as a direct function of the level of said pressure signal;
   conduit means connecting said pressure varying means to the pressure existing in said intake manifold; and
   means for forming an orifice in series flow relation to said conduit means and means forming a housing between said orifice and said cavity, said housing means and said cavity forming a chamber for producing a delay of transient increases in pressure signals from said manifold to said pressure varying means, thereby delaying the increase in fuel rate to said engine.

2. Apparatus as in claim 1 wherein said orifice has a predetermined flow area and said chamber has a predetermined volume for producing a given delay in the transmission of transient pressure signals to said pressure varying means.

3. Apparatus as in claim 2 wherein:
   said orifice forming means comprises a wall blocking the flow path through said housing means, said wall having the orifice formed therethrough.

4. Apparatus as in claim 3 wherein said delay means further comprises:
   a check valve in said wall preventing flow toward said flow control means chamber but providing a substantial flow area in parallel flow relation with said orifice for flow in the opposite direction.

5. Apparatus as in claim 4 wherein said pressure varying means includes:
   a flow control element for providing a variable restriction to fuel flow to said engine as a function of the displacement thereof;
   a diaphragm forming one wall of the flow control means cavity, said diaphragm having a deflectable center section connected to said flow control element to provide a displacement input in response to pressure.

* * * * *